G. W. BINGHAM.
MOVING PICTURE MACHINE.
APPLICATION FILED MAY 17, 1909.
1,119,489.
Patented Dec. 1, 1914.
3 SHEETS—SHEET 3.
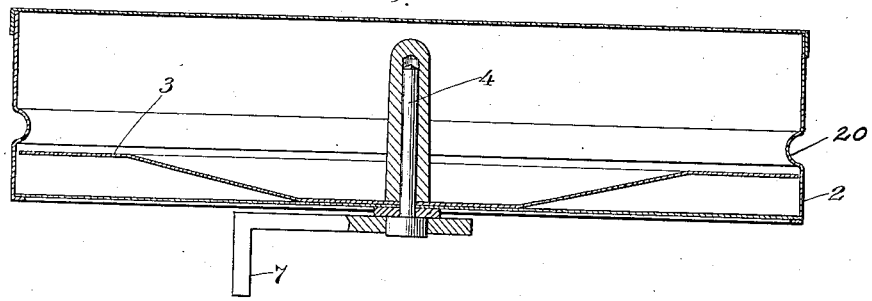
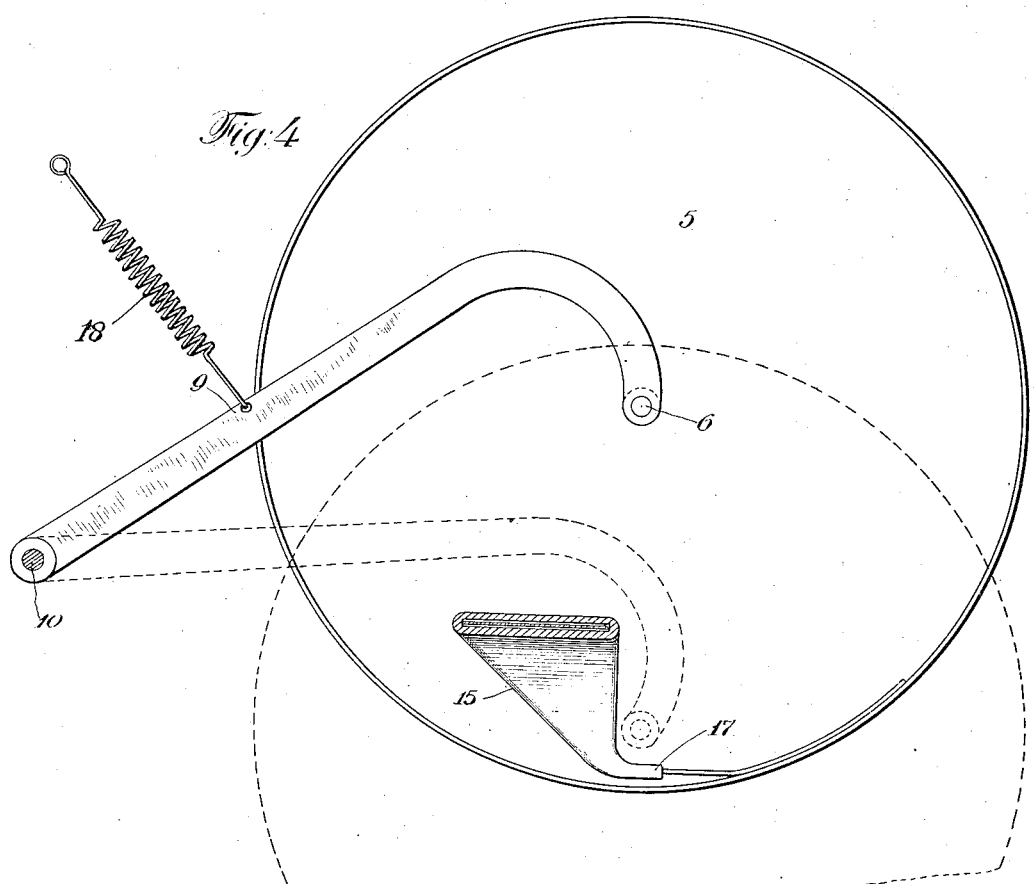

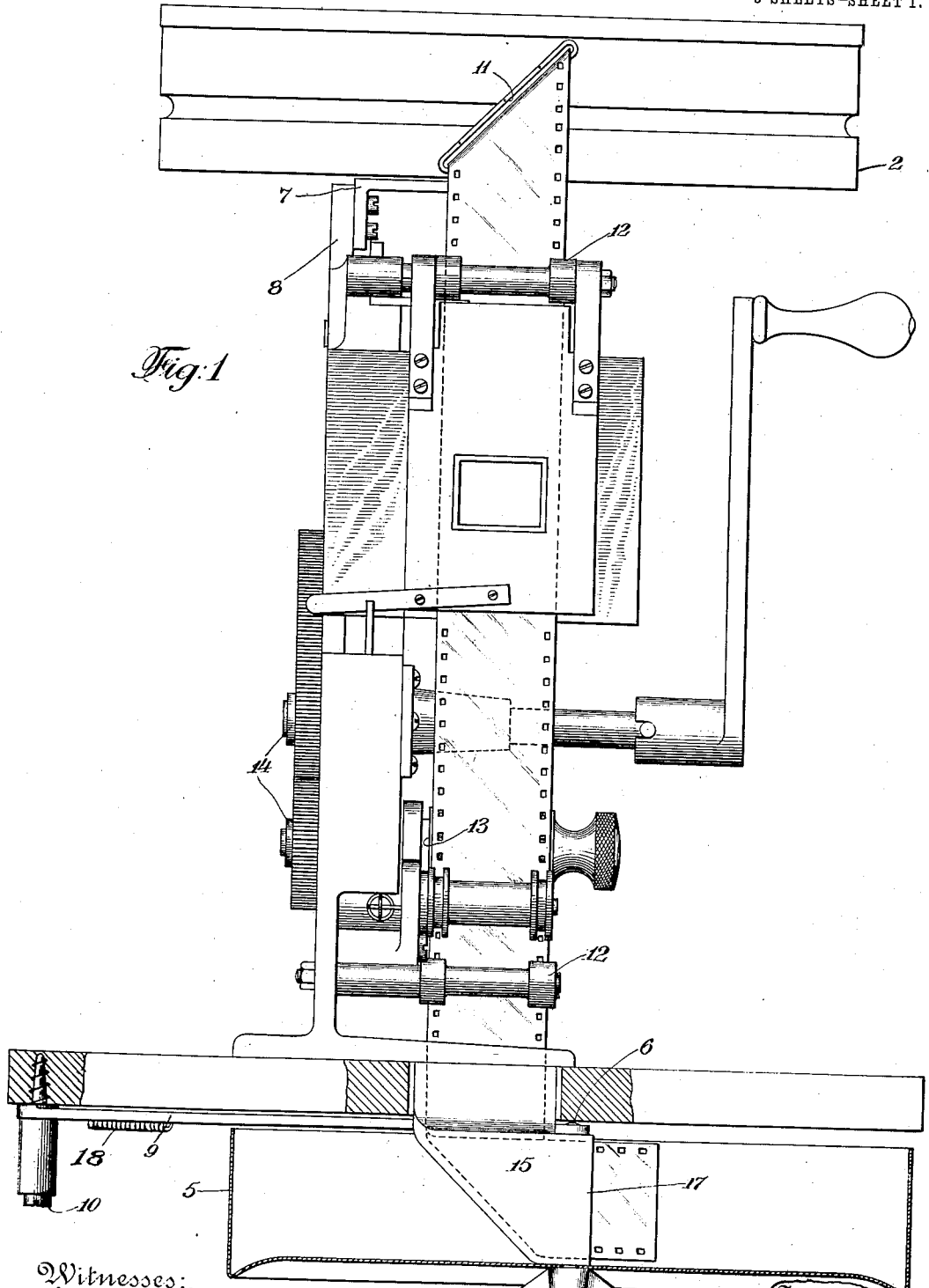

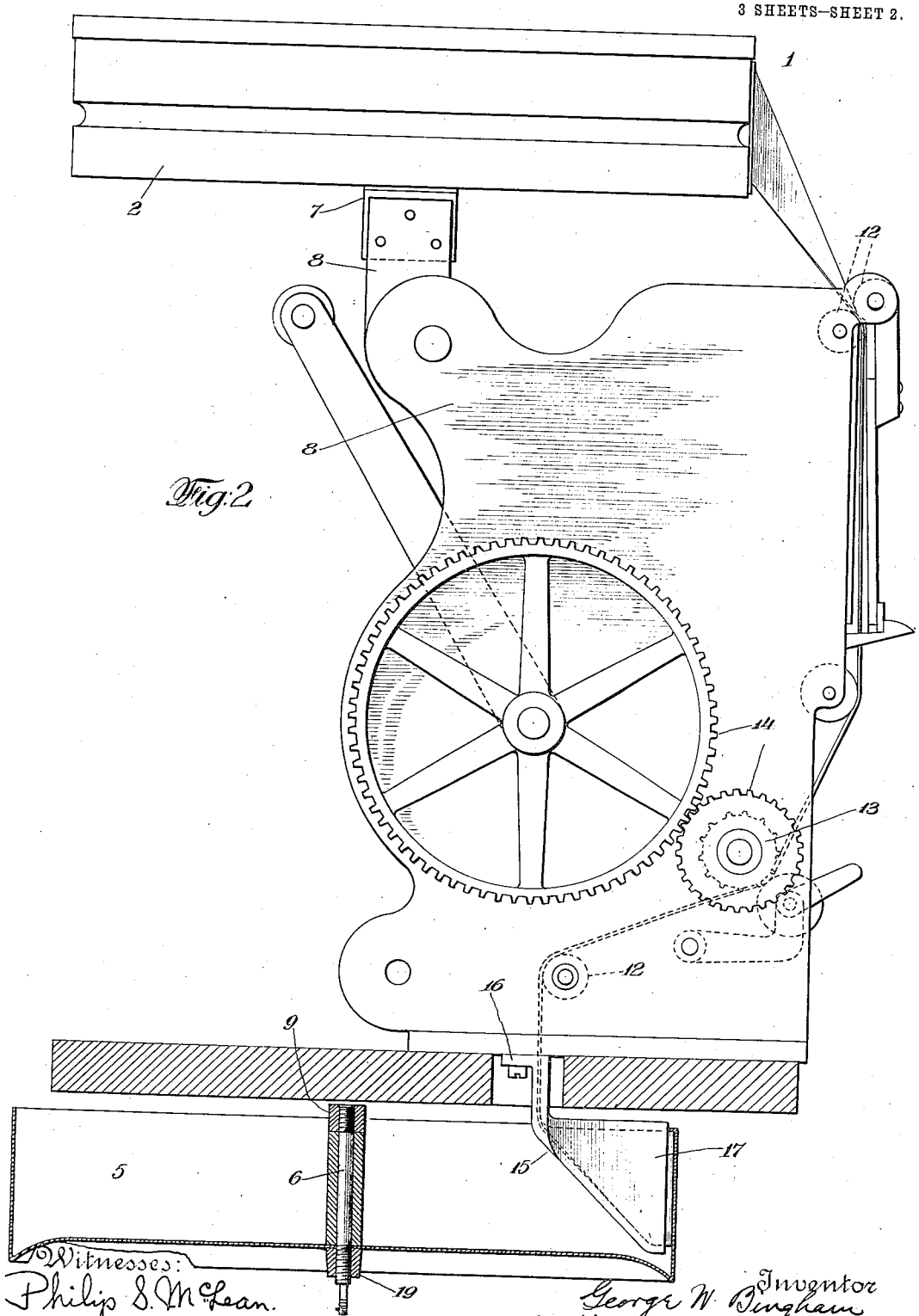

UNITED STATES PATENT OFFICE.

GEORGE W. BINGHAM, OF SHELBURNE FALLS, MASSACHUSETTS, ASSIGNOR TO THE BINGHAM MANUFACTURING COMPANY, A CORPORATION OF MAINE.

MOVING-PICTURE MACHINE.

1,119,489.  Specification of Letters Patent.  Patented Dec. 1, 1914.

Application filed May 17, 1909. Serial No. 496,512.

*To all whom it may concern:*

Be it known that I, GEORGE W. BINGHAM, a citizen of the United States, and a resident of Shelburne Falls, in the county of Franklin and State of Massachusetts, have invented certain new and useful Improvements in Moving-Picture Machines, of which the following is a specification.

My invention relates to improvements in moving picture machines, and in particular to the film mechanism of such machines.

Up to the present time the film in moving picture machines has usually been led from a spool or reel at the upper end of the machine, through the machine to a similar reel at the lower end of the machine, the leading end of the film being connected to the hub of this lower reel, and the final end of the film being connected to the hub of the upper reel. The lower reel is driven by suitable means, such as a belt, so that as fast as the film is exhibited, it is wound on the lower reel. When so wound on the take-up reel, the leading end or starting point of the film is innermost or at the center portion of the reel. In order then to get at the leading end of the film for the purpose of again displaying the pictures, it has been necessary to reverse this winding process and entirely rewind the film back on to the upper supply reel. Hhis rewinding process is objectionable for a number of reasons, among others being that a great deal of time is lost in this way, and that the film is subjected during the rewinding to a great deal of unnecessary although unavoidable, wear and tear.

It is the object of my invention to obviate the necessity for rewinding the film and to thereby overcome the objections which heretofore have been incidental to such rewinding. I attain these objects by feeding the film from the supply receptacle to a receiver, and coiling the film in the receiver with the leading end outermost. The film may then be taken from the receiver, placed in the supply receptacle and be again fed through the machine without rewinding or other handling.

In its preferred embodiment the invention consists of two passive members which might properly be called a supporting member and a receiving member, together with means for imparting a feeding motion to the film, and means for guiding the film into the receiving member so as to coil it with the leading end outward. The supporting member might, and preferably would consist of a casing having a revoluble disk mounted therein for the support of the film roll, and the receiving member would preferably consist simply of a circular receptacle or shell, mounted so as to follow freely the coiling motion of the film. The means for guiding the film into the receiving member consists preferably of a twisted tubular member through which the film is passed and which is preferably curved to impart to the issuing end of the film a proper curvature to assist in the coiling action of the film. Also the receiving member and the guiding member are preferably movably disposed one with respect to the other so as to guide the film from the periphery of the receiving member inward toward the center thereof.

While my invention is particularly adapted for use in connection with moving picture machines, and for the purpose of disclosure is so described in this application, I would have it understood that the invention as a whole, or the various features thereof, might readily be adapted to tape or ribbon handling machines, or other than moving picture machines, and the claims of this application are intended to cover the use of the invention for whatever purposes it may be found practicable.

In the accompanying drawings is illustrated the preferred embodiment of the invention but various changes may be made therein without departing from the scope and spirit of the invention.

Figure 1 is a rear end view of a moving picture machine equipped with my invention. Fig. 2 is a side view of the same. Fig. 3 is a cross sectional view of the upper supporting member for the film. Fig. 4 is a plan view of the receiver and the guide, the full lines showing the initial position with the film being fed to the rim of the receiver, and the dotted lines showing a later position with the film being fed to the center of the receiver.

In the drawings like reference characters indicate like parts throughout the several views.

The supporting member as a whole is designated by the numeral 1, and this member consists preferably of an outer relatively stationary casing 2, and an inner supporting disk 3 rotatably mounted upon the pivot 4 within the casing. In order to prevent the outer convolutions of the film roll from slipping down between the wall of the casing and the edge of the supporting disk, there is preferably provided an annular guard 19, usually in the form of an annular rib, as shown, on the wall of the casing, which projects inward over the edge of the disk.

The receiver or receiving member is designated 5 and it consists preferably of a hollow circular shell or receptacle journaled to rotate upon the pivot 6.

In the preferred form of the invention, and as herein illustrated, both the supporting member and the receiving member are mounted horizontally and the film is fed in a vertical line between the two members. I do not, however, wish to be limited to this horizontal disposition of the supply and receiving members, since so far as certain features of the invention are concerned, and for certain purposes, it may be found desirable to mount these members vertically, on a slant, or in some position other than horizontal.

The supporting member may conveniently be carried by a bracket 7 supported from the table, or secured to the upper part of the frame 8 of the moving picture or other machine. The receiver is preferably suspended from an arm 9 which is pivoted on the center 10, so as to have a swinging movement, the purpose of which will be later described.

A guide is preferably provided for the film at the point of issuance from the supporting member, and this guide may conveniently be in the shape of a guiding slot 11 in the wall of the casing 2, which is preferably disposed at an angle, as shown, so as to turn the film over as it leaves the supporting member, and give it the proper downward twist. This slot is of sufficient size and is disposed at such an angle that the film will not scratch, and will either not touch, or will barely engage the walls of the slot. If desirable, an outstanding guide may be substituted for the slot guide or guide rolls of the usual type.

The film is guided through the machine by a sufficient number of guide rolls 12, and feeding motion is imparted to the film by some suitable feeding device such as the sprocket roll 13, the teeth of which engage in the perforations in the border of the film in the usual manner. The feed roll, shutter mechanism and other parts of the machine are driven by suitable gears 14 from the operating crank of the machine. These driving means have been illustrated more or less diagrammatically since they form no part of the present invention.

Some means are necessary for guiding the used film into the receiver and this means preferably takes the shape of a tubular guiding member 15, which receives the film from the guide roll of the machine. This tubular guide is formed with a gradual twist, as illustrated, so that in passing therethrough the film is twisted substantially at right angles, from a vertical to a substantially horizontal plane. The twist of the tubular guide is preferably a gradual one so as not to strain or buckle the film. The guide may be supported in any suitable manner, and in the present instance it is shown as provided with a bracket 16, which may be attached to the table or the frame of the machine. The mouth or exit end 17 of the guide is preferably curved on an arc approximating the curvature of the receiver so that as the film issues from the guide, it is curved to correspond to the curvature of the retaining wall of the receiver. The receiver and the guiding member are preferably movably supported one with relation to the other so that as the roll of film in the receiver increases in size, either the receiver or the guide will move so as to feed the film toward the center of the receiver. In the present instance the receiver is shown as movably supported with relation to the guide, this being the simpler and preferred form. If the film is not to be used right away, it is stored, and is ready for immediate use at any time.

It will be evident that both the supporting member and the receiving member remain inactive or passive, the feeding of the film being accomplished entirely by means of the feeding device. The film then, driven by the feeding device, simply unwinds from the supporting member and rewinds of itself into the receiving member. The receiving member is pivoted so as to rotate freely and to therefore offer very slight resistance or none to the coiling action of the film. The leading end of the film, as it issues from the mouth of the tubular guide, contacts with the wall of the receiving member, and under the influence of this contact the receiving member commences to rotate. The film thus imparts rotation to the receiving member and is automatically coiled from the periphery of such member, inward toward the center thereof. When the film first commences feeding into the receiving member, the mouth of the guide lies adjacent to the wall of the receiver, but as the roll increases in size the receiver is gradually displaced, allowing the guide to feed nearer the center of the receiver. The supporting arm for the receiver is preferably curved near its end to permit of proximation of the center of the receiver and the mouth of the guide. If desirable, a weak spring 18 or similar device might be employed to normally hold the parts in initial feeding position, that is, with the retaining wall of the receiver and the mouth of the guide adjacent. The film after being coiled in the receiver, is removed therefrom and placed in the supporting member, and as the leading end of the film is still outermost, it may be fed through the machine without any change or reversal. As a means for permitting removal of the roll from the receiver, a securing screw 19 may be employed to provide an easily detachable connection between the receiver and its support.

What is claimed, is:

1. In combination with a supporting member for a roll of flexible tape, a winding barrel for the tape, means adapted to feed the tape into the winding barrel, the winding barrel being loosely mounted so as to receive motion from the feeding action of the tape and to thereby coil the tape within said barrel.

2. In combination, a film support, a rotatable film receiver, means engaging the film to impart a feeding movement thereto, and a guide for directing and coiling the film within the receiver, the receiver and guide having a movement one relative to the other to permit coiling action of the film within the receiver.

3. The combination with a supporting member and a rotatable winding barrel, means for conveying a flexible tape from the supporting member to said barrel, and a guide for coiling the tape within the barrel, the barrel and guide having a relatively radial movement one with respect to the other so as to coil the tape from the outer portion toward the center of the receiver.

4. The combination with film feeding mechanism of a moving picture machine, of a tubular guide for the film, and a rotatable winding barrel for the film mounted for a swinging movement with relation to the guide so as to move toward the guide as the roll of film increases in thickness.

5. In a moving picture machine, the combination of a relatively stationary guiding means, a film receiver mounted to rotate idly around its own axis and to oscillate idly with reference to the guiding means on a center outside of its axis of rotation, and means for moving a film through said guiding means substantially radially into the receiver and against the outer walls thereof, the film receiver being rotated and oscillated by the impulse from the moving film, whereby the film is wound into the receiver inward toward the center thereof with its leading end out.

6. In combination with a moving picture machine, film feeding mechanism comprising a support for the unused portion of the film, a receiver for the used portion of the film mounted to rotate freely upon its own axis, means for guiding the film into the receiver, and means for imparting a feeding movement to the film, whereby the contact of the film with the receiver will cause the receiver to rotate and the film to be coiled within the receiver with the leading end out.

7. Film feeding mechanism for moving picture machines comprising a support for the unused portion of the film, a guide for the film, means for imparting a feeding movement to the film, a receiver for the used portion of the film mounted to rotate freely upon its own axis, said receiver being disposed so as to be contacted by the leading end of the film issuing from the guide and to be rotated thereby, and the receiver further having a radial movement with respect to the guide, whereby the film will be coiled within the receiver inward toward the center thereof.

8. In mechanism for winding a film with the leading end outermost, a revoluble winding barrel, means for feeding a film against the inner periphery of the barrel, the feeding means and barrel having a movement relative one to the other as the wound coil increases in thickness.

9. In mechanism for winding a film with the leading end outermost, a revoluble winding barrel, means for feeding a film against the inner periphery of the barrel, and means permitting the relative movement of the barrel and feeding means as the wound coil increases in thickness.

10. In mechanism for winding a film with the leading end outermost, a revoluble winding barrel, means for delivering the film to said barrel, and means for keeping said delivering means adjacent the inner turn of the film coil during the entire winding operation.

11. In mechanism for winding a film with the leading end outermost, a revoluble winding barrel, means for delivering the film to said barrel, and means for relatively moving said delivering means and barrel, whereby said delivering means is adjacent the inner turn of the film coil during the entire winding operation.

12. In mechanism for winding a film with the leading end outermost, an idle rotatable drum, and means for feeding a film against the interior periphery of the drum in a circumferential direction, whereby the drum is rotated in the direction of feed.

13. In mechanism for winding a film with the leading end outermost, an idle rotatable winding drum, means for feeding a film against the interior periphery of the drum in a circumferential direction, whereby the drum is rotated in the direction of feed, the feeding means and drum having a movement relative one to the other as the wound coil increases in thickness.

14. In mechanism for winding a film with the leading end outermost, an idle rotatable winding drum, means for feeding a film against the interior periphery of the drum in a circumferential direction, whereby the drum is rotated in the direction of feed, and means permitting the relative movement of the drum and feeding means as the wound coil increases in thickness.

15. In mechanism for winding a film with the leading end outermost, an idle rotatable winding drum, and a twisted tubular guide for feeding the film against the interior periphery of the drum in a circumferential direction, whereby the drum is rotated in the direction of feed.

16. In mechanism for winding a film with the leading end outermost, an idle rotatable winding drum, a twisted tubular guide for feeding the film against the interior periphery of the drum in a circumferential direction, whereby the drum is rotated in the direction of feed, the drum and tubular guide having a movement relative one to the other as the wound coil increases in thickness.

17. In mechanism for winding a film with the leading end outermost, an idle rotatable winding drum, means for feeding the film against the interior periphery of the drum in a circumferential direction, whereby the drum is rotated in the direction of feed, and means for keeping said feeding means adjacent the inner turn of the film coil during the entire winding operation.

18. In mechanism for winding a film with the leading end outermost, an idle rotatable winding drum, means for feeding a film against the interior periphery of the drum in a circumferential direction, whereby the drum is rotated in the direction of feed, and means for relatively moving the drum and feeding means, whereby the feeding means is adjacent the inner turn of the film coil during the entire winding operation.

Signed at Shelburne Falls in the county of Franklin and State of Mass. this 29th day of April A. D. 1909.

GEORGE W. BINGHAM.

Witnesses:
  C. W. HAWKS,
  TRACY C. POPE.